United States Patent [19]
Bollinger et al.

[11] Patent Number: 5,312,069
[45] Date of Patent: * May 17, 1994

[54] PROPULSION SYSTEM FOR AN AIRCRAFT PROVIDING V/STOL CAPABILITY

[75] Inventors: Robert S. Bollinger, Newhall; Leland M. Nicolai, Castaic, both of Calif.

[73] Assignee: Lockheed Corporation, Calabasas, Calif.

[*] Notice: The portion of the term of this patent subsequent to Jan. 4, 2011 has been disclaimed.

[21] Appl. No.: 913,576

[22] Filed: Jul. 15, 1992

[51] Int. Cl.[5] .................................. B64C 29/00
[52] U.S. Cl. ........................... 244/12.3; 244/23 B; 244/60
[58] Field of Search .............. 244/12, 23, 55, 60; 60/39.15, 226.1

[56] References Cited

U.S. PATENT DOCUMENTS

| | | | |
|---|---|---|---|
| 1,130,623 | 3/1915 | Mustonen . | |
| 2,899,149 | 8/1959 | Breguet | 244/12.3 |
| 2,918,231 | 12/1959 | Lippisch | 244/23 B |
| 3,025,025 | 3/1962 | Duttmann | 60/226.1 |
| 3,033,492 | 5/1962 | Rowe | 244/23 |
| 3,068,647 | 12/1962 | Santamaria et al. | 60/226.1 |
| 3,122,343 | 2/1964 | Leibach et al. | 244/60 |
| 3,181,294 | 5/1965 | Donohue | 60/39.15 |
| 3,194,516 | 7/1965 | Messerschmitt | 60/226.1 |
| 3,258,911 | 7/1966 | Bouquet et al. | 60/39.15 |
| 3,517,509 | 6/1970 | Bayati | 60/226.1 |
| 3,783,618 | 1/1974 | Kawamura | 244/23 B |
| 3,972,490 | 8/1976 | Zimmermann et al. | 244/12 |
| 4,469,294 | 9/1984 | Clifton | 244/12.3 |
| 4,474,345 | 10/1984 | Musgrove | 244/53 |
| 4,791,783 | 12/1988 | Neitzel | 60/262 |
| 4,828,203 | 5/1989 | Clifton et al. | 244/12.3 |

FOREIGN PATENT DOCUMENTS

| | | | |
|---|---|---|---|
| 2736120 | 2/1978 | Fed. Rep. of Germany | 244/12.3 |
| 2917303 | 10/1980 | Fed. Rep. of Germany | 60/226.1 |

OTHER PUBLICATIONS

Bevilaqua et al., WO 91/17083, Nov. 14, 1991.

Primary Examiner—Galen L. Barefoot
Attorney, Agent, or Firm—Louis L. Dachs

[57] ABSTRACT

The invention is a propulsion system for powering an aircraft in both vertical and horizontal flight modes. In detail, the invention includes first and second gas-driven ducted lift fans mounted in the aircraft for providing thrust in the vertical flight mode. First and second shaft-driven ducted cruise fans that have inlet ducts and by-pass air ducts that are mounted in the aircraft for providing thrust in the horizontal flight mode and supercharged air for the engines in all flight modes. First and second gas transfer ducts couple the bypass air ducts of the first and second ducted cruise fans to the first and second turbo compressors, respectively. First and second shaft-driven turbo compressors are mounted in the first and second gas transfer ducts, respectively. First and second high-pressure feed ducts couple the first and second shaft-driven turbo compressors to the first and second ducted lift fans, respectively. A combustor is mounted in each of the high-pressure feed ducts, the combustor for providing high energy gases for driving the ducted lift fan. First and second sets of turboshaft engines are mounted in the aircraft with each one of the sets comprising a plurality of the turboshaft engines, each of the turboshaft engines including an output shaft and having an optimal power output sufficient for powering one of the ducted cruise fans in the horizontal flight mode, each of the sets having a sufficient number of the turboshaft engines to provide an optimal power output for powering one of the turbo compressors and one of the ducted cruise fans in the vertical flight mode.

6 Claims, 5 Drawing Sheets

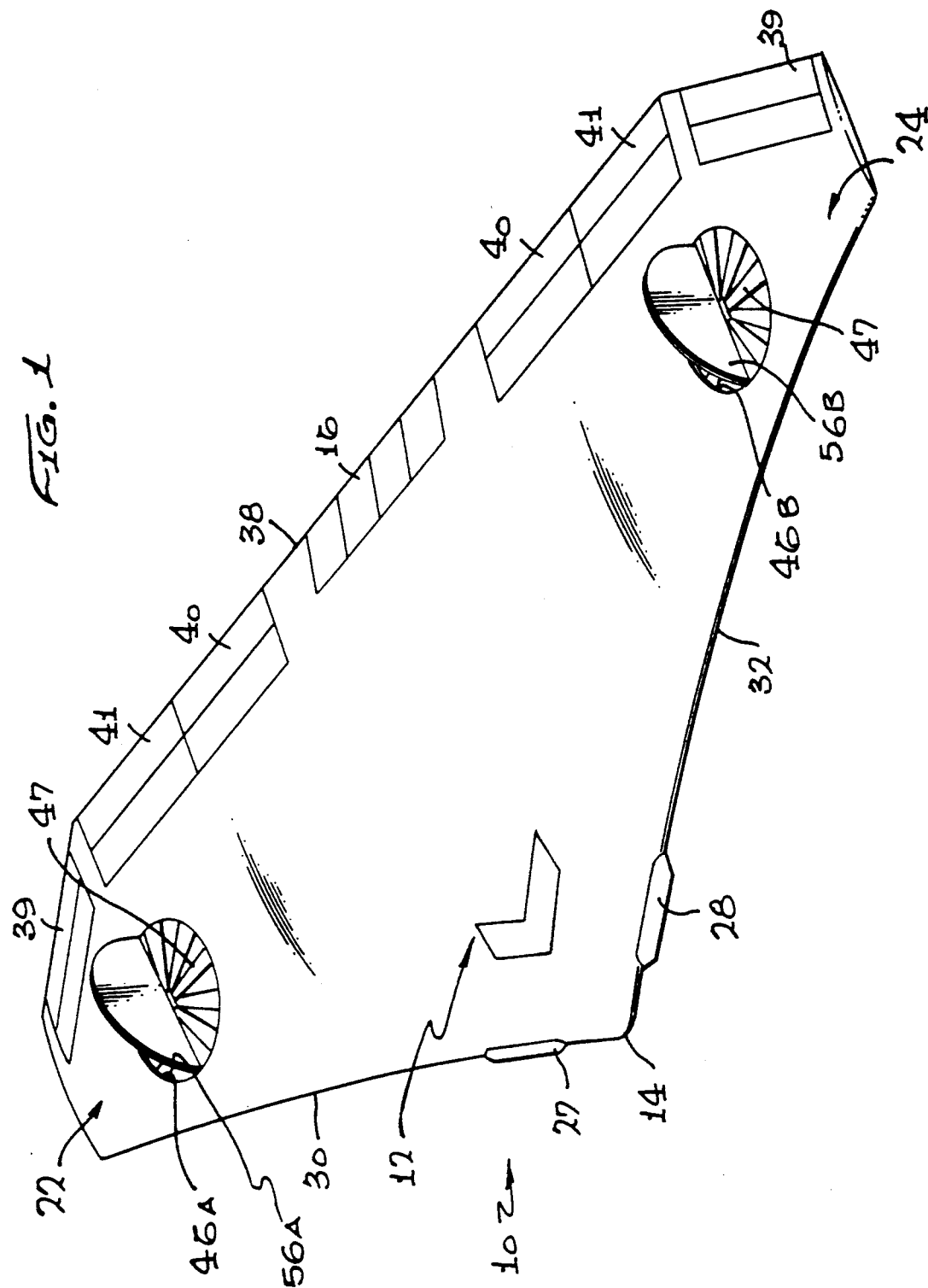

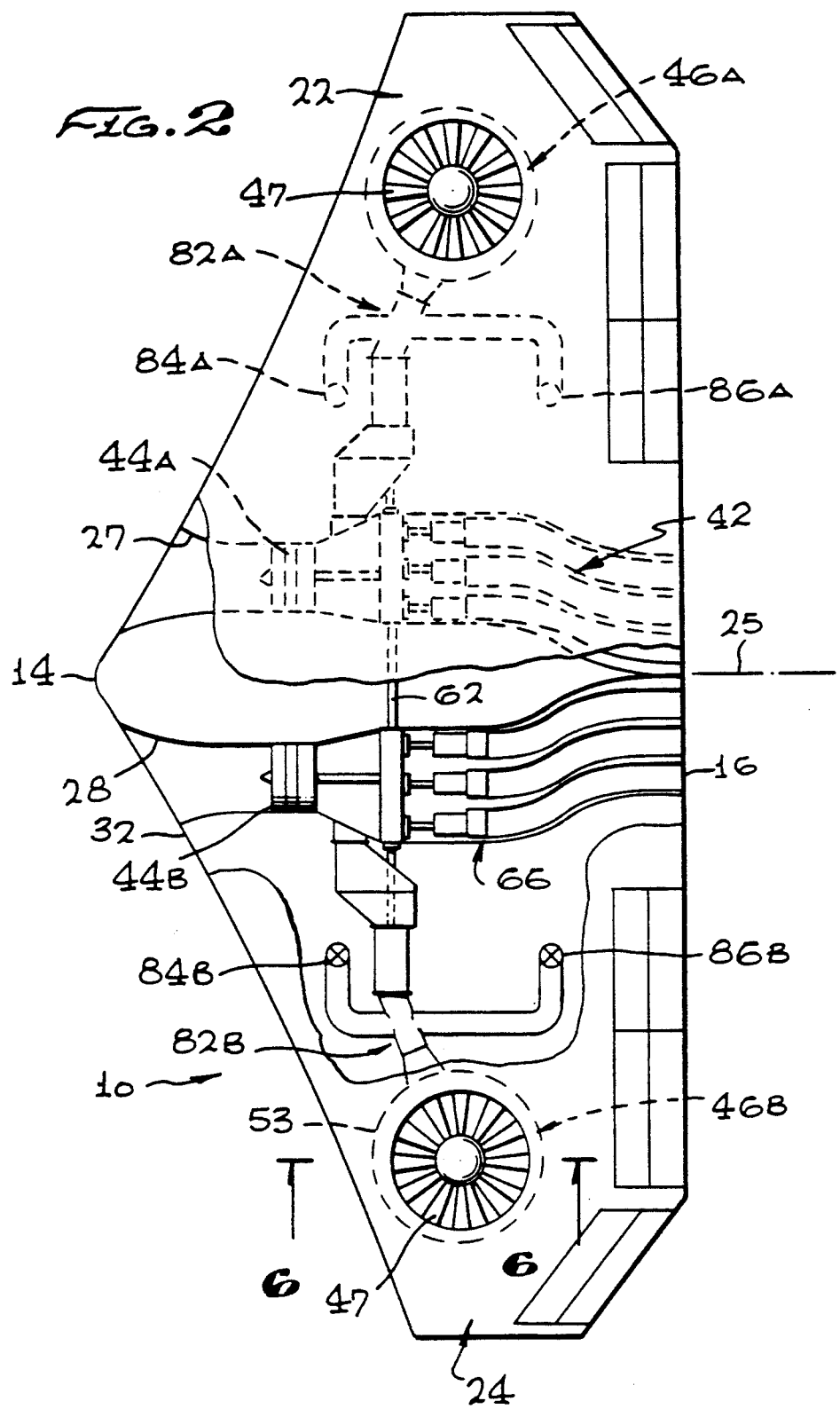

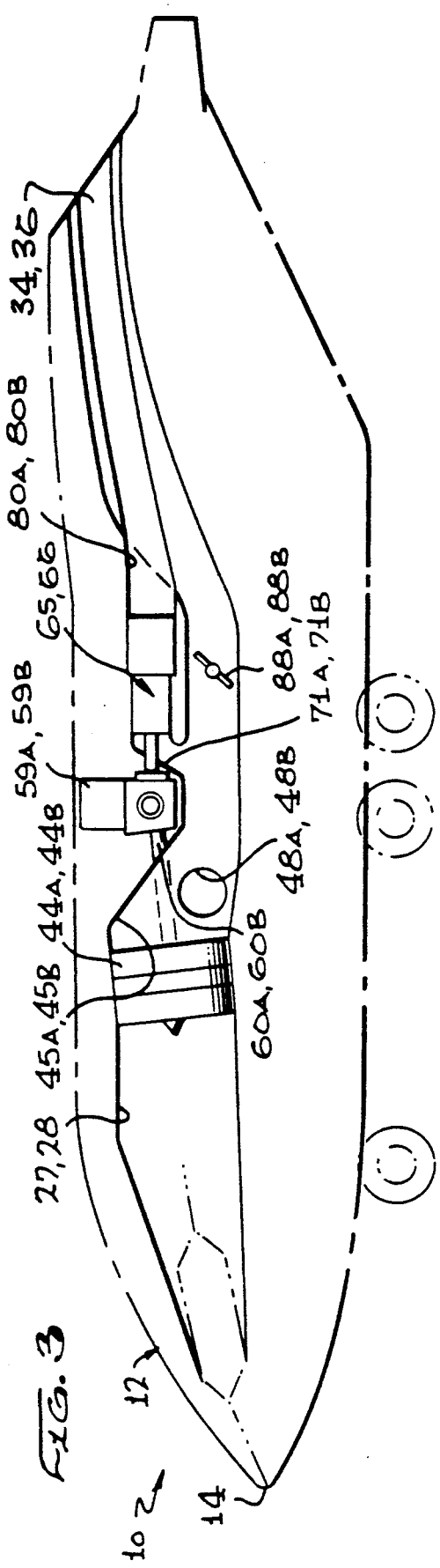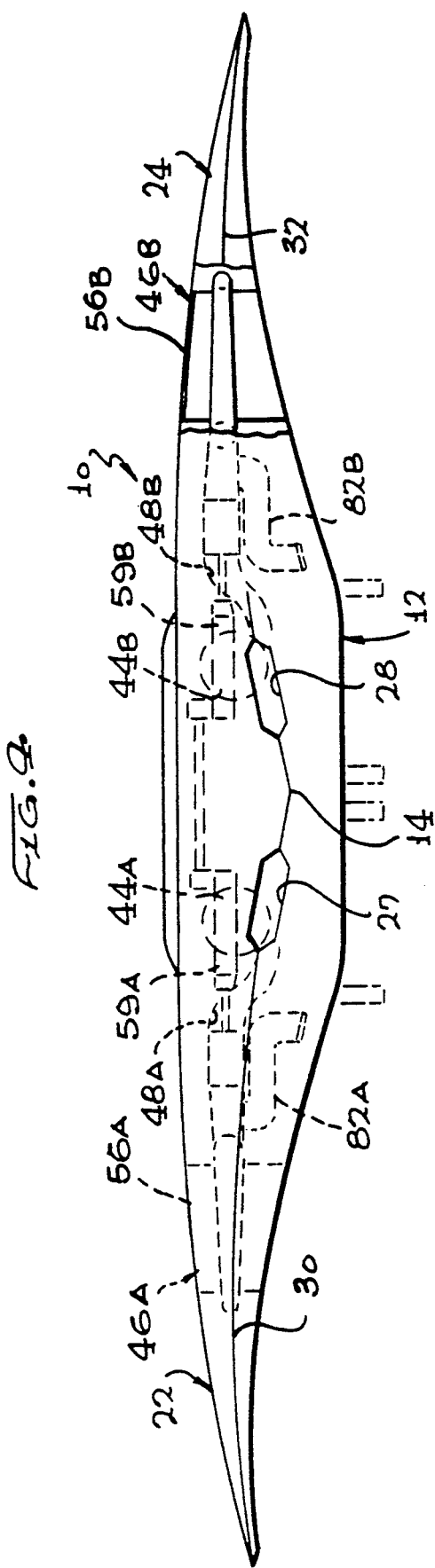

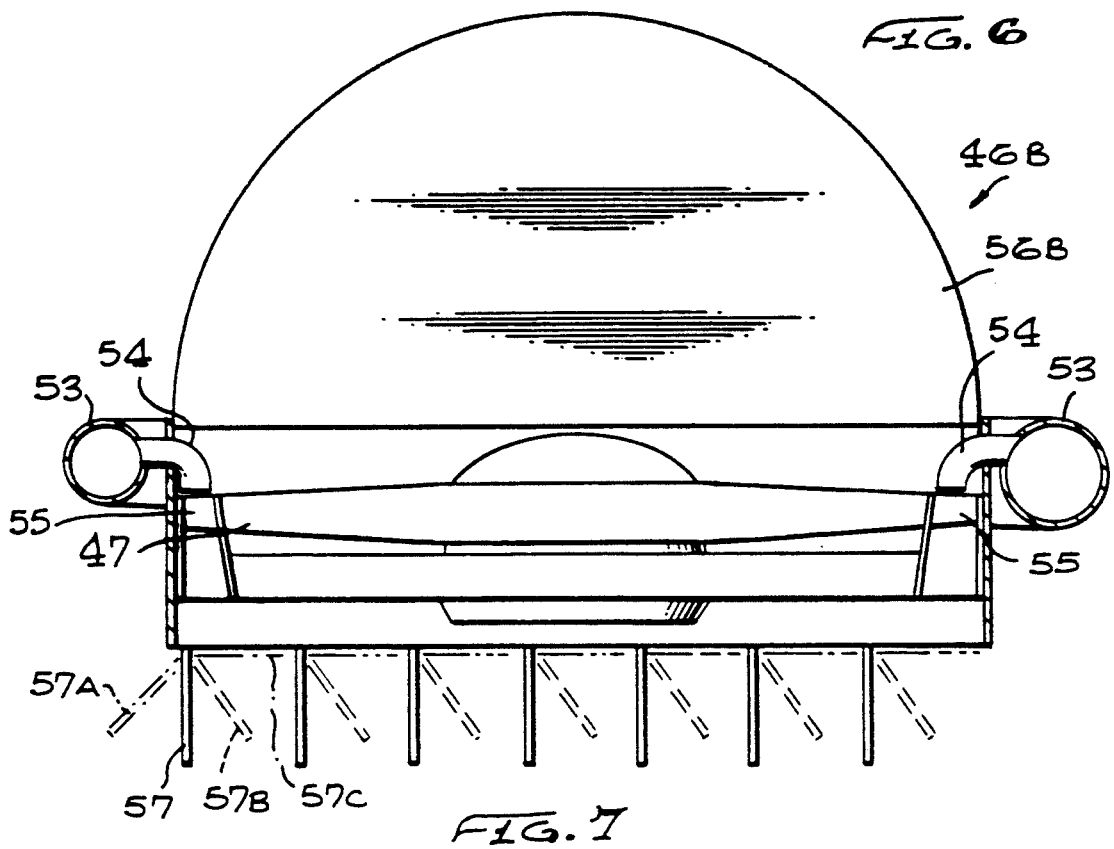

PROPULSION SYSTEM FOR AN AIRCRAFT PROVIDING V/STOL CAPABILITY

BACKGROUND OF THE INVENTION

1. Field of the Invention

The invention relates to the field of propulsion systems for aircraft and, in particular, to propulsion systems for vertical and/or short take-off aircraft (V/STOL).

2. Description of Related Art

The efficiency of a propulsion system for an aircraft is maximized when the velocity of the exhaust gases equals the velocity of the aircraft in its flight direction at minimum specific fuel consumption. Thus during take off, landing and hovering, it is obvious that a helicopter, which provides a small incremental velocity to a large mass of air (low disc loading), is more efficient than a jet aircraft, which provides a large incremental velocity to a small mass of air (high disc loading). However, a helicopter, because of its very large diameter rotor, has a limited forward velocity, of less than 200 Knots due to compressibility effects on the rotor blade tips. Thus most V/STOL aircraft are compromises, which either limits the forward velocity of the aircraft (helicopter) or requires oversized engines for vertical flight (jet aircraft) causing a loss in cruise efficiency.

For example, the AV-8A Harrier V/STOL aircraft utilizes a turbofan engine for both hover and cruise propulsion. The turbofan engine was sized to produce adequate thrust for vertical lift in hover, but its correspondingly large frontal area increases the drag of the aircraft and limits its maximum speed to less than Mach 1 (approximately 580 Knots at sea level). However, the turbofan exhaust is of significantly high velocity and, thus propulsion efficiency is low at cruise velocities because the engine is oversized for this flight mode and hovering, which requires maximum power, for any significant amount of time is avoided because of the high fuel consumption.

In U.S. Pat. No. 4,474,345, "Tandem Fan Series Flow V/STOL Propulsion System," by R. G. Musgrove, a jet engine with a small fan, which is capable of providing supersonic performance, is modified to provide vertical lift. The basic engine fan is split to provide fore and aft fans connected by means of a common drive shaft. The fans are centrally mounted in a duct located within the aircraft along its longitudinal axis. In normal wingborne flight, (hereinafter referred to as horizontal flight mode), the fans operate in series with the fan exhaust mixing with the turbine exhaust and exiting through a nozzle located at the rear of the aircraft. In the vertical mode of operation, a diverter is positioned downstream of the forward fan and is movable to a position for diverting the exhaust from the forward fan downward relative to the longitudinal axis of the aircraft, while simultaneously opening an auxiliary inlet for permitting the introduction of air to the aft fan. An aft diverter is located in the nozzle which is also moveable to a position for diverting the exhaust from the aft fan and engine core downward. Thus for vertical flight the diverters are actuated causing the exhaust from both fans and the core engine to be directed downward fore and aft of the center of gravity of the aircraft. However, the tandem fan engine has less thrust in the vertical takeoff and landing mode of operation than it has in the normal flight mode of operation. The thrust is greater in cruise because airflow passes through both fans, and thus the core is supplied with air that is raised to a higher pressure level (supercharged); whereas, in the vertical mode the core engine airflow passes through only the aft fan. Consequently, the tandem fan concept is not an efficient design for a V/STOL aircraft.

Another more efficient approach is to couple a separate large diameter lift fan to the main turbofan by means of a drive shaft. The lift fan is clutched in and powered only during vertical flight modes. In addition, both the fan section and turbine section exhaust are deflected downward to provide lift. Increased performance is obtained because some of the turbofan's power is being used to drive the lift fan, which is more efficient at the low vertical take-off and landing speeds. Such a system can be found in co-pending U.S. patent application Ser. No. 07/521,211, "Propulsion System For A V/STOL Aircraft," filed May 5, 1990. However, as with all the designs discussed above, the propulsion systems are designed primarily for supersonic high-speed flight and modified for V/STOL operation. They are not readily applicable for subsonic aircraft where significant hover time is required.

In U.S Pat. No. 4,791,783, "Convertible Aircraft Engine," by R. E. Neitzel, a turbofan concept is disclosed for converting almost all the power used by the engine fan to shaft horsepower to drive a helicopter rotor. Guide vanes located on both sides of the outer portion of the engine fan can be actuated to block off air flow through the fan duct while still allowing air flow into the engine core. A gear mounted on the forward end of the fan shaft is coupled to a drive shaft which in turn drives the rotor. Such a system provides maximum efficiency during take off and landing and also during normal flight. However, if high-speed flight (greater than 0.5 Mach), is to be accomplished, the rotor must be either stopped (x-wing concept) or stopped and stowed. The former concept requires an extremely complex computer-controlled pneumatic blowing system that, to this date, has not been successfully developed. The latter system causes a severe weight penalty and requires a complex folding and stowing system. Furthermore, it is difficult to achieve low-observable (LO) characteristics with either design.

The tilt rotor concept found in the V-22 Osprey aircraft, uses large diameter propellers powered by two cross-shafted turboshaft engines. Its disc loading is higher than a helicopter, but lower than a turbofan and, thus is efficient in the vertical flight modes; however, the large propellers limit the top speed to about 300 Knots at sea level. Again, this is due to compressibility effects on the propeller tips. Furthermore, the large propellers eliminate it as a candidate for missions where a low radar cross-section is required. Tilt pylon-mounted turbofan engines can obtain a higher cruising speed, but lose vertical flight mode efficiency because of the high-disc loadings. In addition, pylon-mounted engines of any type, where the fan is visible to radar signals, are also unsuitable for LO missions.

The type of V/STOL aircraft that appears to be most suitable for missions where low radar cross-section is required is one where the entire propulsion system is imbedded in the aircraft wing and/or fuselage. For example, as in a ducted fan-in-wing for the vertical flight mode and turbojet or turbofan engines for the horizontal flight modes. The overall concept is rather old, dating at least back to 1914. For example, U.S. Pat.

No. 1,130,623, "Flying Machine," by M. L. Mustionen, discloses pylon-mounted lift propellers and a pusher propeller mounted in the tail, all powered by a single-piston engine. However, with modern V/STOL aircraft, safety requirements dictate the use of multiple engines with cross-shafting to obtain engine-out performance in the vertical flight mode. Examples of this concept can be found in U.S. Pat. No.'s 4,828,203, "Vertical/Short Take-Off And Landing Aircraft," and U.S. Pat. No. 4,469,294, "V/STOL Aircraft," both by R. T. Clifton, et al. This aircraft design uses two pylon-mounted ducted propellers for the vertical flight mode and a rear-mounted ducted propeller for the horizontal flight mode. Two engines are mounted in the airframe and "belt drive" a common shaft that is directly connected to the rear-mounted propeller. The drive shaft is also connected to a right-angle gearbox which in turn drives the two pylon-mounted ducted lift propellers by means of belt drives. It is apparent that such a combination aircraft design and propulsion system, as configured, does not lend itself to LO missions because of the rear-mounted ducted propeller used for the horizontal flight mode. However, even if it were installed in a proper airframe, it still would not provide the necessary propulsion efficiency and engine-out performance required for any practical aircraft.

The basic problem is that in an aircraft, such as a transport, the ratio of thrust required for takeoff in the vertical flight mode to that required for efficient cruise in the horizontal flight mode is on the order of 10 to 1. Having multiple engines simply to provide for engine-out capability yields a thrust mismatch between the cruise and vertical flight modes. If the aircraft has only two engines and it requires both engines for a normal takeoff in the vertical flight mode, then each engine alone must be able to provide the total thrust required (in a max power setting for engine-out capability. This means that each of the two engines must be greatly oversized and, therefore, will yield very poor cruise efficiency. It's either this approach or stay with a single engine, as in the AV-8A Harrier aircraft.

In applicants' co-pending patent application U.S. patent Ser. No. 07/917,241 "Propulsion System For An Aircraft Providing V/STOL Capability," filed Jul. 22, 1992, this problem is addressed. In detail, the invention includes a pair of ducted lift fans mounted on the aircraft for providing thrust in the vertical flight mode. A pair of ducted cruise fans is mounted in the aircraft for providing thrust in the horizontal flight mode. Two sets of turboshaft engines are mounted in the aircraft with each of the sets comprising a plurality of the turboshaft engines. Each turboshaft engine includes an output shaft and has an optimal power output sufficient for powering one of the pair of ducted cruise fans in the horizontal flight mode. Each of the sets includes a sufficient number of the turboshaft engines to provide an optimal power output for powering one of the pair of ducted lift fans and one of the pair of ducted cruise fans in the vertical flight mode. A shafting system is mounted on the aircraft for coupling all of the turboshaft engines to the first and second pairs of ducted fans. A first decoupling system is connected to the shafting system for decoupling the pair of ducted lift fans from the first and second sets of turboshaft engines. Finally, a second decoupling system is connected to the shafting system for individually decoupling each of the turboshaft engines from the shafting system. This invention incorporated various combinations of turboshaft engines and shafting systems to provide power for vertical lift, good cruise efficiency, and one-engine-out capability. However, the mechanical shaft connection between the combiner gearbox and ducted lift fans imposes weight and/or design integration problems. The minimum weight combiner gearbox is one in which the power output shafts are either 90 degrees or 180 degrees to the power input shafts. Since the ducted lift fans in the wing need to be located at the center of gravity, to minimize the lift fan pitching moments, the combiner gearbox is forced to be located near the center of gravity to keep the propulsion system light. This feature reduces the flexibility of the designer in locating the turboshaft engines and cruise fans along the longitudinal axis of the aircraft, since these systems need to be close to the combiner gearbox. In addition, good design practice dictates certain length inlets and exhaust ducts (especially in low observable applications) such that this restriction on the locating of the cruise fans, combiner gearbox and turboshaft engines results in very limited design flexibility with respect to configuring the fuselage.

To eliminate these potential weight and integration problems, hot gas driven ducted lift fans have been substituted for the shaft-driven ducted lift fans. An example of this approach can be found in U.S. Pat. No. 3,972,490, "Trifan Powered V/STOL," by V. H. Zimmermann. In this invention, the exhaust from two turbine engines is connected by ducts to a nose-mounted, tip-driven, ducted lift fan and two pylon-mounted ducted cruise fans. The cruise fans, which are also tip driven, incorporate fan exhaust deflectors that are extended to divert the fan exhaust downward during the vertical flight mode. During the horizontal flight mode, the ducts to the ducted nose-mounted lift fan are closed off by means of valves. In U.S. Pat. No. 3,033,492, "Cruise Lift Fan System," by B. H. Rowe, a propulsion system is disclosed wherein two tip-driven ducted fans are mounted on pylons such that they can be rotated from the horizontal, for cruise, to the vertical for take-off and landing. The two ducted fans are driven by exhaust gases from two turbojet engines or the like. This concept suffers from a requirement for large internal wing volume to accommodate the hot gas ducts between the turbine engines and the hot gas driven ducted lift fans.

While these inventions eliminate the weight of the gearboxes, shafts, etc., and the necessity of locating the combiner gearbox ams turboshaft engines near the center of gravity, it does not address the previously mentioned problem of matching the propulsion system to the ducted lift fans and ducted cruise fans when in separate flight modes and still provide engine-out capability. To date, no prior design has sufficiently addressed this problem in exhaust gas driven ducted lift fans.

Thus it is a primary object of the subject invention to provide a propulsion system for a vertical and/or short take-off and landing aircraft.

It is another primary object of the subject invention to provide a propulsion system for a vertical and/or short take-off and landing aircraft that provides increased propulsive efficiency.

It is a further object of the subject invention to provide a propulsion system for use in low-observable vertical and/or short take-off and landing aircraft.

It is a still further object of the subject invention to provide a propulsion system for a vertical and/or short take-off and landing aircraft that provides engine-out capability.

It is still further object of the subject invention to provide a propulsion system for a vertical and/or short take-off and landing aircraft that provides optimum or near optimum efficiency of the propulsion system in both the vertical and horizontal flight modes.

It is another object of the subject invention to provide a propulsion system for a vertical and/or short take-off and landing aircraft that provides increased design flexibility in locating the vertical lift fans relative to the other components of the propulsion system.

SUMMARY OF THE INVENTION

The invention is a propulsion system for powering an aircraft in both vertical and horizontal flight modes. In detail, the invention includes first and second gas-driven ducted lift fans mounted in the aircraft, preferably in the wings, for providing thrust in the vertical flight mode. The ducted lift fans are located on the center of gravity of the aircraft so that pitching moments, due to the thrust of the lift fans, are eliminated. The ducted lift fans include movable covers on the top that remain open while in the vertical flight mode and which are closed in the horizontal flight mode. Also, incorporated on the bottom of the ducted lift fans are adjustable louvers that are used to direct the lift fan exhaust fore and aft and to modulate the lift fan thrust. First and second shaft-driven ducted cruise fans, having inlet and bypass air ducts, are mounted in the aircraft for providing thrust in the horizontal flight mode. Preferably, these ducted cruise fans are mounted between the ducted lift fans. First and second gas transfer ducts couple the bypass air ducts of the first and second ducted cruise fans to the first and second shaft-driven turbo compressors, respectively. First and second shaft-driven turbo compressors are mounted in the first and second gas transfer ducts, respectively, to increase the pressure of the gas to the ducted lift fans. First and second high-pressure feed ducts couple the first and second shaft-driven turbo compressors to the first and second ducted lift fans, respectively. The gas energy provided to the ducted lift fans is increased further by mounting a combustor in each of the high-pressure feed ducts, downstream of the turbo compressors and immediately prior to the entrance of the ducted lift fans, wherein fuel can be injected and burned to increase the energy of the gas driving the ducted lift fans.

First and second sets of turboshaft engines are mounted in the aircraft with each one of the sets comprising a plurality of the turboshaft engines. Each of the turboshaft engines includes an output shaft and has an optimal power output sufficient for powering one of the first and second ducted cruise fans in the horizontal flight mode. The inlets of the first and second sets of turboshaft engines are mounted within the bypass air ducts of the first and second ducted cruise fans, respectively, such that the ducted cruise fans supercharge the turboshaft engines. Each of the sets has a sufficient number of the turboshaft engines to provide an optimal power output for powering one of the first and second ducted cruise fans and one of the first and second turbo compressors such that gas flow of sufficient energy is provided to drive one of the ducted lift fans.

A shafting system is mounted on the aircraft for coupling all of the turboshaft engines to the pair of ducted cruise fans and turbo compressors. The shafting system includes first and second combiner gearboxes coupled to the output shafts of the turboshaft engines of the first and second sets thereof, respectively. Each combiner gear-box includes a first output drive shaft coupled to one of the turbo compressors, a second output drive shaft coupled to one of the ducted cruise fans and a third output shaft coupling the two combiner gearboxes together. A first decoupling system (typically a clutch assembly) is connected to the shafting system for decoupling the first and second turbo compressors from the first and second sets of turboshaft engines. A second decoupling system is connected to the shafting system for individually decoupling each of the turboshaft engines therefrom.

A separate pitch control system is included. It comprises first and second duct systems coupled to the first and second high-pressure feed ducts, respectively, downstream of the turbo compressors, that terminate in downward directed nozzles fore and aft of the center of gravity of the aircraft. Pitch control is achieved by selectively modulating air flow out the individual nozzles. Yaw control is provided by movement of the lift fan louvers to slightly vector the downward thrust of the ducted lift fans, forward on one and aft on the other. Additionally, the vertical thrust from the ducted lift fans can be modulated to provide control power for vertical and roll control by moving the louvers in a stagger arrangement (one louver forward and adjacent louver aft).

The propulsion system functions in the following manner. For takeoff, all the turboshaft engines of both sets of turboshaft engines are operational and the clutch assemblies are all engaged. The ducted cruise fans supercharge both the turboshaft engines and the turbo compressors. Fuel is injected into and burned in the combustors providing increased energy to the gas driving the ducted lift fans. The ducted lift fan covers and louvers are open.

With all engines operating, the ducted lift fans are used to achieve vertical takeoff. After sufficient altitude has been reached, the louvers are slowly moved to an aft position directing more and more ducted lift fan exhaust from a vertical direction to a rearward direction as the aircraft transitions to the horizontal flight mode. When sufficient lift is produced to sustain wingborne flight, the fuel flow to the combustors is stopped, the turbo compressors are de-coupled and stopped, the ducted lift fans spin down, and the covers and louvers are closed. Thereafter, all but one of the engines in the first and second sets of engines are de-clutched and shut down and cruise is accomplished using "single-engine-driven ducted cruise fans." The important advantage of this system is that by proper selection of the size and number of turboshaft engines, efficient matching of the engines to the particular flight regime can be achieved while also providing engine-out capability, due to the use of multiple engines and cross-shafting. Since the inlet of all the turboshaft engines are located in the low-velocity region behind the ducted cruise fans, the drag associated with shutting down one or more engines is inconsequential.

The landing procedure is a reverse of that used for takeoff. The turbo compressors are engaged to spin up the ducted lift fans while the aircraft is still in wingborne flight (horizontal flight mode). The top covers and lower louvers are opened as gas flow to the ducted lift fans is increased and fuel is provided to the combustors and ignited. The lower louvers are vectored slightly forward to decelerate the aircraft from the horizontal flight mode to hover. As more thrust is required from the lift fans for hover, the louvers are slowly moved aft to the vertical position.

The novel features which are believed to be characteristic of the invention, both as to its organization and method of operation, together with further objects and advantages thereof, will be better understood from the following description in connection with the accompanying drawings in which the presently preferred embodiment of the invention is illustrated by way of example. It is to be expressly understood, however, that the drawings are for purposes of illustration and description only and are not intended as a definition of the limits of the invention.

BRIEF DESCRIPTION OF THE DRAWINGS

FIG. 1 is a perspective view of a V/STOL aircraft incorporating the subject propulsion system.

FIG. 2 is a top view of the aircraft shown in FIG. 1, particularly illustrating the subject propulsion system mounted therein.

FIG. 3 is a side view of the aircraft shown in FIG. 1.

FIG. 4 is a front view of the aircraft shown in FIG. 1.

FIG. 6 is a partial cross-sectional view of the aircraft shown in FIG. 2 taken along the line 6—6, particularly illustrating the tip-driven ducted lift fan and ducted lift fan exhaust directing louver system for the wing mounted ducted lift fans and its upper covers.

FIG. 7 is a schematic showing the arrangement of the louvers to obtain vertical, horizontal, roll and yaw control.

DESCRIPTION OF THE PREFERRED EMBODIMENT

Figure 5:
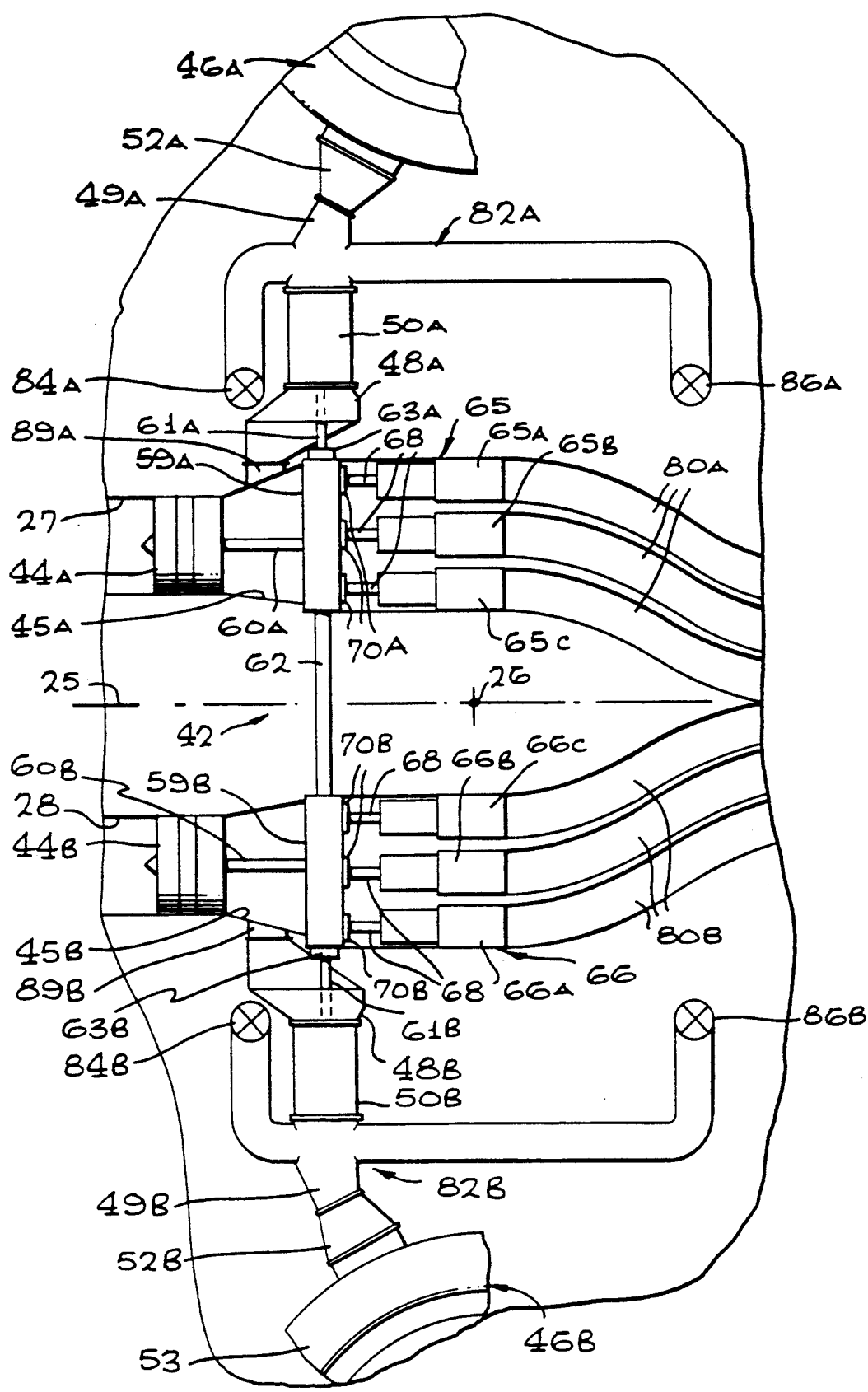
FIG. 5 is an enlarged portion of FIG. 2, particularly illustrating a portion of the propulsion system's turbo-shaft engines, ducted lift fan and ducted cruise fan, shafting system, pitch control system, turbo compressor, combustor, ducting and combiner gearboxes.

Referring to FIGS. 1–7 together, a transport type aircraft is illustrated and generally designated by numeral 10 having a nose 14, tail 16 and high-mounted wings 22 and 24, well integrated into the fuselage 12. The center of gravity and longitudinal axis of the aircraft are indicated by numerals 25 and 26, respectively. The engine inlet ducts 27 and 28 are located at the leading edges 30 and 32 of the wings 22 and 24, respectively, at the junction thereto to the fuselage 12. Two-dimensional exhaust ducts 34 and 36 exit the aircraft near the trailing edge 38. Additionally illustrated are ailerons 39 for roll control, elevators 40 for pitch control and drag rudders 41 for pitch control, in the horizontal flight mode. The aircraft 10 is meant to be representative of multi-engine transports of general V/STOL configuration and, thus should not be construed as limiting the application of the subject propulsion system.

The subject propulsion system, generally designated by numeral 42, includes ducted cruise fans 44A and 44B mounted within the aircraft and coupling the inlet ducts 27 and 28 to bypass air ducts 45A and 45B, respectively. The bypass air ducts 45A and 45B slop generally downward and then upward in a "u shape and join to the exhaust nozzles 34 and 35, respectively. A pair of gas-driven ducted lift fans 46A and 46B, having fan blades 47, are mounted in the wings 22 and 24 on the center of gravity 25 of the aircraft. Gas transfer ducts 48A and 48B couple the bypass air ducts 45A and 45B of the ducted cruise fans 44A and 44B to the shaft-driven turbo compressors 50A and 50B. Shaft-driven turbo compressors 50A and 50B are mounted in the gas transfer ducts 48A and 48B. High-pressure feed ducts 49A and 49B couple the turbo compressors 50A and 50B to the ducted lift fans 46A and 46B. Combustors 52A and 52B are mounted within the high-pressure feed ducts 49A and 49B downstream of the turbo compressors 50A and 50B and immediately prior to the entrance of the ducted lift fans 46A and 46B. The combustors 52A and 52B are adapted to receive fuel, which is ignited, greatly increasing the energy of gas being directed to the ducted lift fans.

Referring particularly to FIGS. 5 and 6 (only fan 46B is illustrated), the high-pressure feed ducts 49A and 49B are coupled to circular-shaped distribution chambers or plenums 53 that extend about the ducted fans 46A and 46B and terminate in ring shaped nozzles 54. The fan blades 47 have turbine-like tip members 55 that extend into the ring shaped nozzles; thus the exhaust gases from the combustors 52A and 52B drive the tip members 55 causing the fan blades 47 to rotate. The ducted lift fans 46A and 46B also include split covers 56A and 56B, respectively, shown in the open position. These covers are opened when the aircraft is operating in the vertical flight mode and transitioning to the horizontal flight mode and are closed in the horizontal flight mode.

The vertical mode flight control strategy is shown on FIGS. 6 and 7. Deflecting the louvers provides the control power for roll, yaw, horizontal and vertical control during hover. The ducted lift fans 46A and 46B include a plurality of louvers 57, which are shown in the fully extended position in solid lines and in the partially, fore, aft and fully closed positions in dotted lines and indicated by numerals 57A, 57B and 57C, respectively. As they translate, they are able to direct ducted lift fan exhaust forward to provide reverse thrust when transitioning from the horizontal to the vertical flight modes and backward providing forward thrust during transition from the vertical to the horizontal flight modes. In addition, they provide horizontal control and yaw control during the vertical flight mode (hover). The louvers can be deflected in a stagger arrangement as shown in FIG. 7 and thereby spoil or reduce the thrust from the ducted lift fans, providing vertical control (collectively) or roll control (individually). Additionally, brake assemblies (not shown) are incorporated into the ducted lift fans for stopping the fan blades 47 after transition to the horizontal flight mode. It should be noted that such gas-driven ducted lift fans are old in the art and, thus, need not be discussed in further detail. The pitch control system will be subsequently discussed.

Combiner gearboxes 59A and 59B are located outside the bypass air ducts 45A and 45B aft of the ducted cruise fans 44A and 44B (in the middle of the "U"). The combiner gearboxes 59A and 59B include: first power-output shafts 60A and 60B connected directly to the ducted cruise fans 44A and 44B, respectively; second power-output shafts 61A and 61B coupled to the turbo compressors 50A and 50B, respectively; and a third shaft 62 that serves as a cross-shaft between the two combiner gear boxes. Clutch assemblies 63A and 63B are mounted between the shafts 61A and 61B and the combiner gearboxes 59A and 59B, respectively. Additionally, the combiner gearboxes incorporate power transmission gears 63 to appropriately distribute power.

First and second sets of turboshaft engines, 65 and 66 are mounted outside the the bypass air ducts 45A and 45B (within the "U" shaped portion) with each set having three turboshaft engines 65A, 65B and 65C, and 66A, 66B and 66C respectively. All the engines have a output drive shaft 68 with the output drive shaft of the turboshaft engines of the first and second sets 65 and 66 coupled to the combiner gear-boxes 60A and 60B, respectively, via clutch assembles 70A and 70B. The first and second sets 65 and 66 of turboshaft engines our coupled to the bypass air ducts 45A and 45B by inlet ducts 71A and 71B, respectively.

Each turboshaft engine of each set is "sized" to provide an optimal power output to drive one of the ducted cruise fans. Thus in the horizontal flight mode, two engines, one from each set, are required to remain in operation and all the remaining turboshaft engines are shut down. Each set of turboshaft engines contains a sufficient number of turboshaft engines to provide an optimal power output to operate one of the first and second turbo-compressors and one of the first and second ducted cruise fans in the vertical flight mode and still provide engine-out capability.

As illustrated in FIG. 3, the exhaust ducts 80A and 80B of the turboshaft engines of each set 65 and 66 extend into the bypass air ducts 45A and 45B, respectively, and terminate co-incident with the exhaust nozzles 34 and 36.

Referring to FIGS. 3 and 4, pitch control in the vertical flight mode is provided by duct systems 82A and 82B that are connected to the high-pressure feed ducts 52A and 52B, respectively, aft of the shaft driven turbo compressors 50A and 50B. This high-pressure air in ducts 82A and 82B is directed downward via variable flow rate nozzles 84A and 84B, and 86A and 86B located fore and aft of the center of gravity and on either side of the longitudinal axis 26. Bypass air control valves 88A and 88B (best seen in FIG. 3) are located in bypass air ducts 45A and 45B, respectively, aft of the turboshaft engine inlets. Gas transfer control valves 89A and 89B (best seen in FIG. 5) are located in the gas transfer ducts 48A and 48B respectively, upstream of the shaft-driven turbo compressors. When the aircraft is in the horizontal flight mode (cruise), the gas transfer control valves 89A and 89B are closed and the bypass air control valves 88A and 88B are open allowing the bypass air to be used for forward thrust. When the aircraft is in the vertical flight mode (hover), the bypass air control valves 88A and 88B are closed and the gas transfer control valves 89A and 89B are open providing supercharged air to the shaft-driven turbo compressors, 50A and 50B, and therefore to the tip-driven lift fans 46A and 46B as well as to the pitch post duct systems 82A and 82B.

The propulsion 42 functions in the following manner. For takeoff, all the turboshaft engines of both sets 65 and 66 are operational and the clutch assemblies 70A and 70B engaged. The clutch assemblies 63A and 63B are also engaged so that the turbo compressors receive power. The covers 55A and 55B and louvers 56 are open. The pressurized bypass air from the ducted cruise fans 44A and 44B is boosted by the turbo compressors 46A and 46B. The "boosted" air is thereafter mixed with fuel in the combustors 52A and 52B, which greatly increases the energy of the gases and used to drive the ducted lift fans 46A and 46B. The vertical thrust from both ducted lift fans is greater than required to lift the aircraft by about 15 percent to provide a margin for suckdown, vertical acceleration and control. The vertical thrust is spoiled by collective stagger of the louvers so that it equals the weight of the aircraft. The amount of stagger is then modulated collectively to accelerate the aircraft vertically. The duct systems 82A and 82B are used for pitch control and the louvers for vertical, horizontal, roll and yaw control. The required power distribution between the turbo compressors and the ducted cruise fans is accomplished by the previously mentioned transmission gears of the combiner gearboxes 59A and 59B.

After sufficient altitude has been reached, the louvers 64 are slowly moved to the aft (56B) and closed position (56C) directing more and more air from a vertical direction to a directly rearward direction as the aircraft transitions to the horizontal flight mode. When sufficient lift is produced to sustain wingborne flight, the clutch assemblies 63A and 63B are disengaged and the ducted lift fans are stopped and the covers and louvers are closed. Thereafter, two engines of each set, 65 and 66, of turboshaft engines are shut down and cruise is accomplished using "single-engine-driven ducted cruise fans."

The important advantage of this system is that by proper selection of the size and number of turboshaft engines, efficient matching of engines to the particular flight regime can be achieved while also providing engine-out capacity due to the use of multiple engines and cross-shafting. In addition, because gas-driven ducted lift fans are used in conjunction with shaft-driven turbo compressors, greater flexibility in the placement of the sets of turboshaft engines and other components of the propulsion system is provided. In the example shown above, six engines were necessary to obtain the vertical flight mode operation and only two engines were necessary for the horizontal flight mode operation while, in both cases, engine-out capability is provided.

The actual aircraft illustrated was designed for short takeoff and landing at maximum gross weight and vertical flight operation (hover) was required only over the target area. Thus the aircraft was designed with a maximum take-off gross weight well over the maximum vertical thrust of the ducted lift fans. However, by the time the target area would be reached, enough fuel would have been consumed such that the gross weight of the aircraft would have been reduced to a value below the ducted lift fan thrust. Of course, the aircraft could have taken off in the vertical flight mode at a reduced fuel or payload condition. The important feature of this invention is that of matching engine performance to the flight mode by: 1) selecting each turboshaft engine so that it has an optimal power output so that the aircraft can operate in the horizontal flight mode, with engine-out capability, 2) adding additional engines to each side to form sets having optimal power output for vertical flight mode operation, with engine-out capability, and cross-shafting the two sets together, provides an optimum or near optimum propulsion system for any aircraft. The above propulsion system provides greater efficiency than any of the propulsion systems disclosed in the previously mentioned prior art.

While the invention has been described with reference to a particular embodiment, it should be understood that the embodiment is merely illustrative as there are numerous variations and modifications which may be made by those skilled in the art. Thus the invention is to be construed as being limited only by the spirit and scope of the appended claims.

INDUSTRIAL APPLICABILITY

The invention has applicability to the aircraft industry.

We claim:

1. A propulsion system for powering an aircraft in both vertical and horizontal flight modes comprising:

first and second gas-driven ducted lift fans mounted to the aircraft for providing thrust in the vertical flight mode;

first and second shaft-driven ducted cruise fans having inlet and bypass air ducts, said first and second ducted cruise fans mounted in the aircraft for providing thrust in the horizontal flight mode and providing supercharged air in all flight modes;

first and second gas transfer ducts, each one thereof coupling one of said air bypass ducts of said first and second ducted fans, respectively;

first and second shaft-driven turbo compressors coupled to said first and second gas transfer ducts, respectively;

first and second high-pressure feed ducts coupling said first and second turbo compressors to said first and second ducted lift fans respectively;

first and second sets of turboshaft engines mounted in the aircraft coupled to said bypass air ducts for receiving supercharged air therefrom, with each one of said sets comprising a plurality of turboshaft engines, each one of said turboshaft engine including an output shaft and having an optimal power output sufficient for powering one of said first and second ducted cruise fans in the horizontal flight mode, each of said sets having a sufficient number of said turboshaft engines to provide an optimal power output for powering one of said first and second turbo compressors and one of said ducted cruise fans in the vertical flight mode, such that sufficient gas is provided to drive one of said ducted lift fans;

a shafting system mounted on the aircraft for coupling all of said turboshaft engines to said first and second ducted cruise fans and said first and second turbo compressors;

a first decoupling system connected to said shafting system for decoupling said first and second turbo compressors from said first and second sets of turboshaft engines; and a second decoupling system connected to said shafting system for individually decoupling each of said turboshaft engines therefrom.

2. The propulsion system as set forth in claim 1 further comprising a combustor mounted in each of said high-pressure feed ducts, said combustor for increasing the energy of the gases for driving said ducted lift fan.

3. The propulsion system as set forth in claim 2 further comprising said sets of turboshaft engines with inlets mounted within said bypass air ducts of said ducted cruise fans, such that said cruise fans supercharge said turboshaft engines.

4. The propulsion system as set forth in claim 3 wherein the aircraft includes wings, the propulsion system further comprising:

said first and second ducted lift fans are mounted in the wings; and said first and second ducted cruise fans are mounted between said first and second ducted lift fans.

5. The propulsion system as set forth in claim 4 wherein said shafting system comprises first and second combiner gearboxes coupled to said output shafts of said turboshaft engines of said first and second sets thereof, respectively, each combiner gearbox having a first output drive shaft coupled to one of said turbo compressors, a second output drive shaft coupled to one of said ducted cruise fans and a third output shaft coupling said combiner gearboxes together.

6. The propulsion system as set forth in claim 5 including means for providing horizontal, vertical, pitch, roll and yaw control of the aircraft in the vertical flight mode.

* * * * *